March 8, 1938. T. P. WRIGHT 2,110,752
METHOD OF APPLYING COVERING TO A FRAME
Filed June 15, 1934 2 Sheets-Sheet 1

INVENTOR.
THEODORE P. WRIGHT.
BY
ATTORNEYS.

March 8, 1938.  T. P. WRIGHT  2,110,752
METHOD OF APPLYING COVERING TO A FRAME
Filed June 15, 1934   2 Sheets-Sheet 2

INVENTOR.
THEODORE P. WRIGHT.
BY
ATTORNEYS.

Patented Mar. 8, 1938

2,110,752

UNITED STATES PATENT OFFICE 2,110,752

METHOD OF APPLYING COVERING TO A FRAME

Theodore P. Wright, Buffalo, N. Y., assignor to Curtiss-Wright Corporation, a corporation of New York Application June 15, 1934, Serial No. 730,682

4 Claims. (Cl. 113—116)

This invention relates to the construction of aircraft wings and is concerned particularly with a method of smoothly applying a thin sheet metal covering skin to a built up wing skeleton.

The invention is adapted for use with the modern type of aircraft wherein a structural framework or skeleton is built up, and over which a metal skin, forming a cover, is attached by rivets or other means. In the case of wings, the upper and lower surfaces are nearly flat, and it has been found extremely difficult to apply the thin skin, in large sheets, and cause the finished surface to be perfectly smooth and free from wrinkles, folds or buckled portions.

To overcome this difficulty, the subject method of construction consists in placing the skeleton structure and/or the skin in a state of deformation while the skin and structure are joined; such deformation takes the form of tensioning the skin and compressing the structure, the tensile or compressive stress imposed in both cases being of an order to appreciably strain the material, but such stress in both cases being below the elastic limit of the material to prevent a permanent set therein. After attachment of the skin to the structure, the above mentioned externally applied stresses are relieved, whereupon the elements tend to return to their original form and the skin is tightly stretched over the structure to an extent such that no wrinkling of the skin may occur.

In an abstract analogy, the fabric covering of the older type wings undergoes the same tensioning during wing assembly, except that the skin tension is obtained by "doping" the fabric after its attachment to the structure, the "doping" having the effect of shrinking the fabric and thus stretching it tightly over the structure. Since the metal skin and structure cannot be so treated, the subject method accomplishes a similar ultimate result.

The method herein outlined is particularly useful in applying metal skins to the top and bottom faces of wing structures, but may also be utilized for other members such as fuselages and tail surfaces.

Objects of the invention, as indicated above, are to provide a method for smoothly applying metal skins to aircraft structures, to provide means for temporarily compressing an aircraft or wing structure during assembly of a metal skin thereon and to provide means for temporarily stretching and tensioning a thin sheet metal skin over a structure during assembly of the skin to the structure.

Reference may be made to the drawings, in which similar numbers indicate similar parts, for a more complete understanding of the invention.

Figures 1, 2:
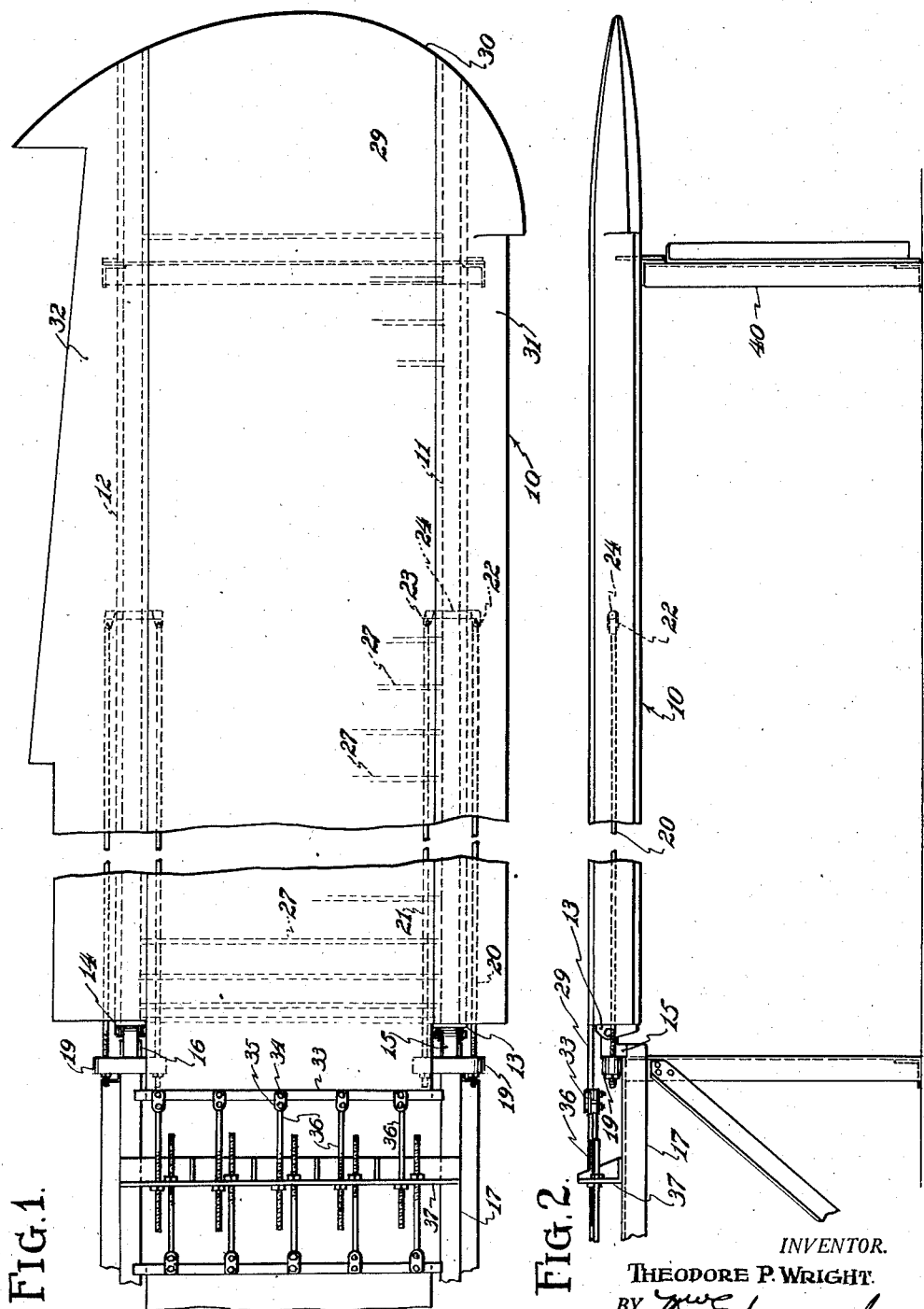
Fig. 1 is a plan of an aircraft wing showing the means for compressing the structure and tensioning the skin.
Fig. 2 is an elevation of the wing on its assembly stand.
Figure 3:
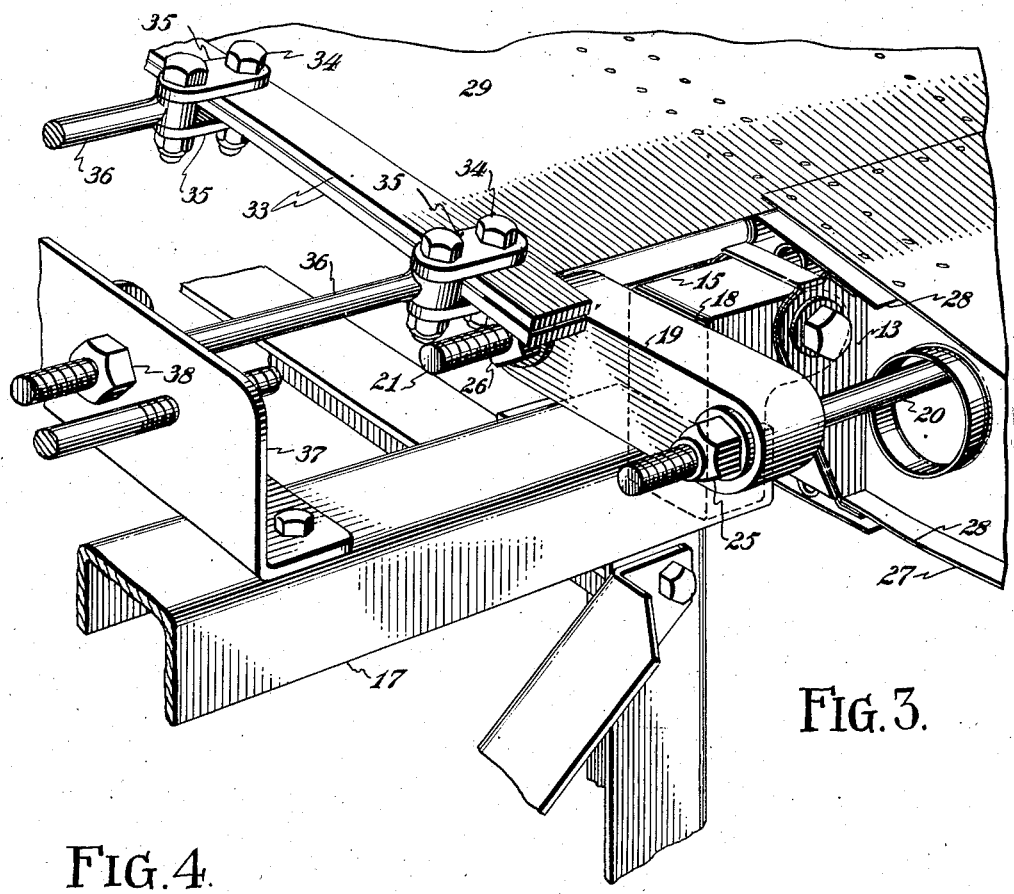
Fig. 3 is a perspective of a portion of the wing and the assembly stand.
Figure 4:
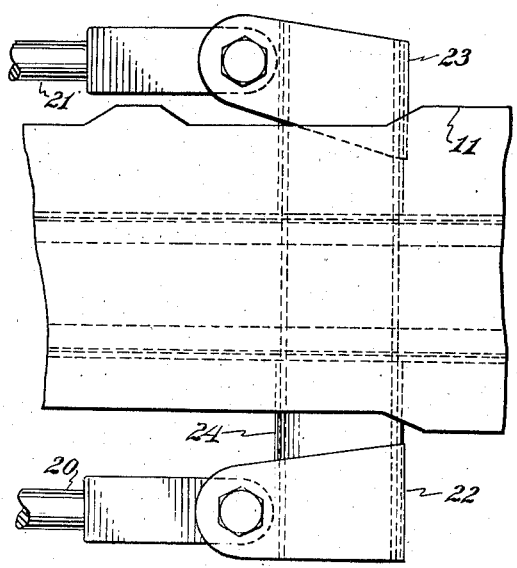
Fig. 4 is a partial plan of a wing spar and a portion of the compressing means.
Figure 5:
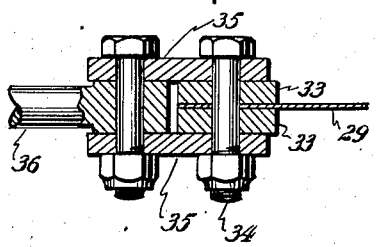
Fig. 5 is a section through one end of a skin sheet and the assembly clamp therefor.

The wing 10 comprises front and rear spars 11 and 12 extending throughout the wing span, and having mounting bosses 13 and 14 at their root ends. These bosses are bolted to blocks 15 and 16 mounted on a stand 17, each block having an abutment face 18 against which a yoke 19 may rest. Long bolts 20 and 21 pass through the yoke and alongside the spar, to terminate toward the wing tip in loop straps 22 and 23. A bar 24 is passed through the spar 11 (or 12) and through the loop straps 22 and 23, after which the nuts 25 and 26 may be tightened, thus placing the bolts 20 and 21 under tension and compressing the spar 11 (or 12). By measuring between suitable reference marks along the spar, the latter may be compressed by adjusting the nuts to the proper degree.

The wing structure includes ribs 27 extending between the spars, these having suitable flanges 28 to which the wing skin may be riveted. The skin sheet 29 is attached along the wing tip as at 30 and lies over the ribs, extending inwardly a slight distance beyond the wing root. Preferably, the skin 29 is of a width to extend between the spars 11 and 12, the nose skin 31 extending forwardly of the spar 11 and the trailing edge skin 32 rearward of the spar 12 being separately attached, and, by virtue of their curved form and narrow width being relatively easily applied.

The inner edge of the sheet 29 is clamped between bars 33 by bolts 34, the latter being carried by links 35 carried on bolts 36. These bolts, of which there are several evenly spaced along the sheet edge, pass through a brace 37 mounted on the frame 17, and nuts 38 may then be tightened on the bolts and against the brace to place the skin sheet 29 under tension. The tension in the sheet may be set up to strain the metal a definite amount.

The strain in the skin 29 and in the spars 11 and 12 should be such that the skin and spar material are not stressed beyond their elastic limit, otherwise their strength would be impaired and no restitutional effect in the skin or structure would accrue to hold the skin tightly over the structure.

Afer the structure and skin have been deformed as above outlined, the skin is riveted or otherwise attached to the ribs 27, and after completion of the skin attachment, the nuts 38 and 25 are loosened. The bars 33 are removed and the inner end of the skin sheet is trimmed away, and the bolts 20 and 21 are removed. By a suitable access opening in the wing, the straps 22 and 23 may be slipped off the bar 24 and the latter removed from the spar. Then the wing is removed from the stand 17. An outer stand 40 serves to support the outer end of the wing during assembly, and may be provided with means attaching it to the wing to hold the wing from movement under the influence of the bolts 20 and 21.

The principle broadly involved in the invention is the relative straining of elements to be assembled, and though a practicable means for accomplishing this is shown and described, I do not wish to limit the invention to the actual structure shown.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

What is claimed is:

1. The method of applying a relatively thin sheet metal skin to an aircraft structure which comprises tensioning the skin within the elastic limit of the skin material, compressing the structure to a degree within the elastic limit thereof, fastening said skin to said structure, and removing the tensioning and compressing forces.

2. The method of applying relatively large flat sheets of sheet metal skin to a metallic skeleton including spars, consisting in applying tension means to compress the spars, fastening the skin to the skeleton, and relieving and removing the tension means from the spars.

3. The method of applying relatively large flat sheets of sheet metal skin to a skeleton, consisting in applying tensioning means to the skin while it lies adjacent the skeleton, fastening the skin to the skeleton, and in removing the tensioning means.

4. The method of applying relatively large flat sheets of sheet metal skin to a skeleton including spars, consisting in applying means to compress the spars within the elastic limit of the spar material, placing the sheet over the skeleton, applying means to tension the sheet within the elastic limit of the skin material, fastening the skin to the skeleton, and relieving and removing the compressing and tensioning means.

THEODORE P. WRIGHT.